United States Patent [19]

Kohno

[11] Patent Number: 4,897,743
[45] Date of Patent: Jan. 30, 1990

[54] METHOD AND APPARATUS FOR RELEASING A MAGNETIC HEAD

[75] Inventor: Keiichi Kohno, Yokohama, Japan

[73] Assignee: Fujitsu Limited, Kawasaki, Japan

[21] Appl. No.: 86,482

[22] Filed: Aug. 18, 1987

[30] Foreign Application Priority Data

Sep. 8, 1986 [JP] Japan .................... 61-211230

[51] Int. Cl.$^4$ .............................. G11B 5/54
[52] U.S. Cl. ........................ 360/75; 360/103
[58] Field of Search ............ 360/69, 71, 75, 103, 360/105, 106, 78, 78.04, 78.06, 78.08, 78.12

[56] References Cited

U.S. PATENT DOCUMENTS 4,530,021 7/1985 Cameron .............................. 360/103
4,542,429 9/1985 Nishida et al. ...................... 360/103
4,589,036 5/1986 Bertschy et al. ...................... 360/75

OTHER PUBLICATIONS

IBM T.D.B., vol. 21, No. 12, "Start/Stop Life Enhancement by Actuator Preload", Hill et al.

Primary Examiner—Alan Faber
Assistant Examiner—Steven R. Garland
Attorney, Agent, or Firm—Staas & Halsey

[57] ABSTRACT

Releasing adhesion between a magnetic head and a magnetic disk by radially moving the head before the disk begins to rotate. The head movement is accomplished by compressing an elastic stopper means by driving a head actuator motor with drive current so that unwanted vibration of bounce back of the head is prevented.

13 Claims, 4 Drawing Sheets

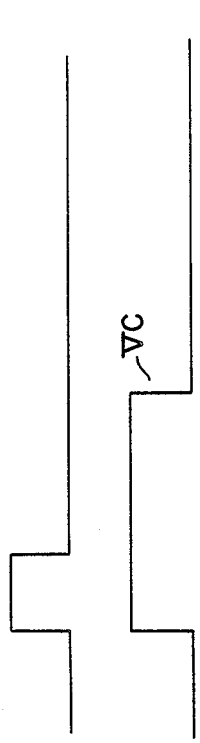
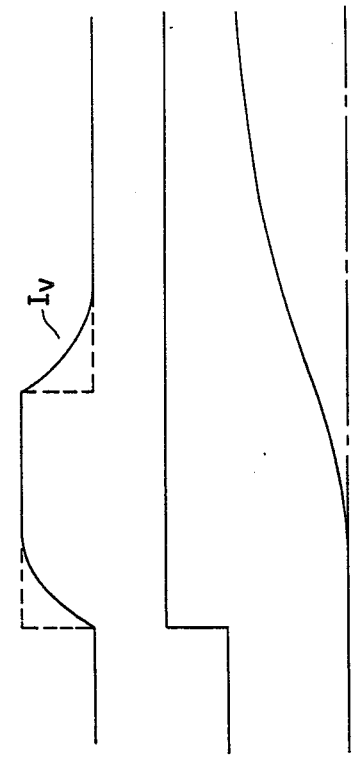
FIG.4(a) FIG.4(b) FIG.4(c) FIG.4(d) FIG.4(e)

METHOD AND APPARATUS FOR RELEASING A MAGNETIC HEAD

BACKGROUND OF THE INVENTION

The present invention relates to a magnetic disk file unit; and more particularly, relates to a method and apparatus for releasing a magnetic head from a magnetic disk when starting up the magnetic disk file unit.

When a magnetic disk file unit is operated, the magnetic head floats on a thin layer of air which is caused by rotation of the disk. Precisely speaking, the magnetic head is part of a slider. In this specification, however, the term "head" refers to the entire slider including the actual magnetic head.

In these days, most magnetic disk file units employ a so-called CSS or "Contact Start Stop" system, in which the head contacts the disk surface when the disk is not rotating. This system is practical because miniaturization of the head has reduced the amount of pressure on the disk due to the head. The use of much cleaner air in the disk housing and the use of a lubricant also aid in making the system practical. The lubricant reduces dynamic friction between the head and the disk when starting and stopping the rotation of the disk and reduces damage if the head either crashes onto the disk due to mechanical shock or the head forces dust into the disk.

However, because heads continue to be further-miniaturized, and because the finish of both the head and disk surfaces are continuingly being made smoother, the head tends to adhere to the disk surface when the disk is not rotated. This adhesion is caused by a kind of attraction force which can occur between two mirror smooth surfaces. This attraction force becomes stronger with presence of the lubricant, and would cause serious damage to the head, its suspension structure or the disk if not released properly.

To ensure the release of the adhesion before starting to rotate the disk, conventional magnetic disk file units employ a specific release mechanism. This mechanism includes moving a head actuator along a radius direction of the disk before the disk starts to rotate. Since the suspension structure gimbals have enough stiffness in the radial direction, the head can be released from the adhesion without causing any damage to the gimbals.

Several ways of moving the head have been proposed. In U.S. Pat. Nos. 4,530,021 and 4,589,036, the head is supplied with an alternating current to cause "micromotion" when starting rotation of the disk. Further, in 4,589,036, actual movement of the head is sensed and the "micromotion" is controlled thereby. However, these methods require a precisely controlled alternating current generator and sophisticated sensing circuits.

Another method, which uses a much simpler circuit, is disclosed in Japanese laid open patent Tokkaisho 61-198480 (published Sept. 9, 1986). In this method, when the unit is stopped, the head actuator is positioned close to a stopper means. The stopper means restricts the actuator movement and comprises an elastic material. Upon starting up the disk unit, the actuator is moved towards the stopper and compresses the elastic material. This causes the head to be slightly offset in the radial direction before the disk actually begins to rotate. This method requires only an actuator drive current large enough to compress the elastic material. A square waveform is used as the drive current, because the movement of the actuator is safely restricted by the stopper.

However, the inventor of present invention has discovered that use of such a simple waveform, with steep rise and fall characteristics can cause serious impact to the head and its gimbals, and in some cases, causes damage to the disk.

SUMMARY OF THE INVENTION

Therefore, it is an object of this invention to provide an improved method and apparatus for a magnetic disk file unit to release the adhesion between the head and the disk with a simple circuit.

Another object of this invention is to provide an improved method and apparatus which releases the adhered head softly and without severe impact to the head.

Yet another object of this invention is to provide an improved method and apparatus which drives a head actuator with a gradually increasing and gradually decreasing acceleration.

To accomplish these and other objects of the present invention, a head actuator motor is driven by a current having gradual rise and fall characteristics.

Yet still other objects and precise solutions thereof will be understood by refering to the attached drawings and explanations thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 4 consisting of (a)-(e), is a timing chart of various signals of the FIG. 3 circuit.

DETAILED DESCRIPTION OF THE PREFERRED EMBODIMENT

Figure 1:
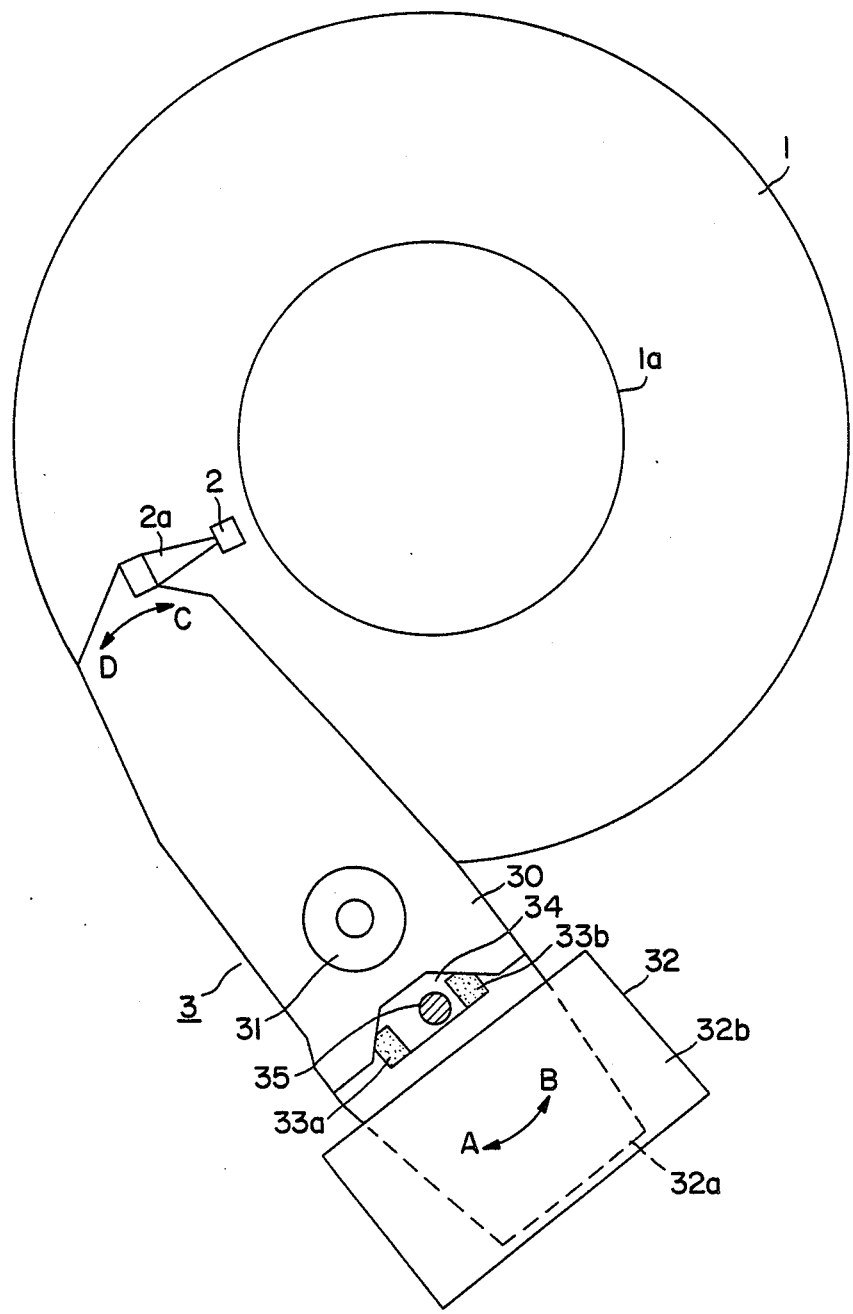
FIG. 1 is a partial plane view of a conventional magnetic disk memory unit.

FIG. 1 is a partial plane view of a conventional magnetic disk memory unit in which a magnetic disk 1 rotates around a spindle 1a, and a magnetic head 2 is actuated by a so-called swing-arm type actuator 3. This actuator 3 includes: a swing arm 30; a rotation axis 31; a voice-coil motor 32 comprising a coil winding 32a fixed at the one end of the swing arm 30 and a magnetic circuit 32b fixed on a frame (not shown); a recess 34 on the swing arm 30; stoppers 33a and 33b positioned at the both ends of the recess 34, the stoppers comprise an elastic material such as rubber; a stop pin 35 secured to the frame (not shown) and positioned between the stoppers 33a and 33b; and gimbals 2a fixed at the other end of the swing arm 30, the head 2 is suspended from gimbals 2a.

When a drive current is applied to the coil winding 32a, one end of the swing arm 30 is driven in the direction indicated by the arrow A-B, the direction depending on the polarity of the drive current. The other end of the swing arm 30, and thus the head 2, is driven in the direction indicated by the arrow C-D. The stop pin 35, together with the stoppers 33a and 33b, restrict the movement of the swing arm 30 within a specific region so that the head 2 does not exceed a specific region on the disk surface.

Figure 2:
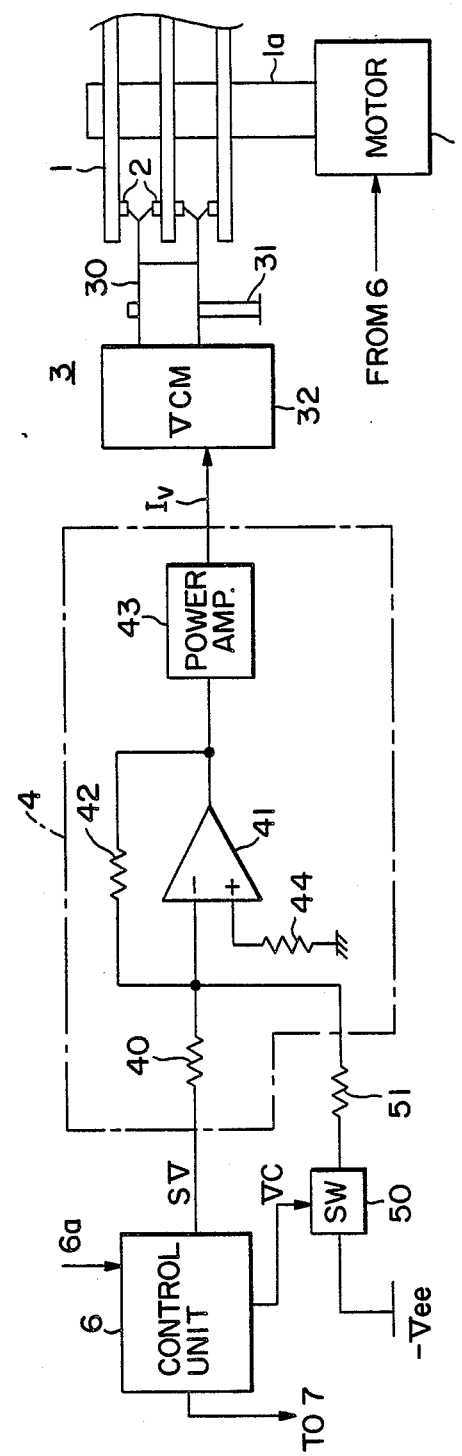
FIG. 2 illustrates a conventional head actuator motor drive circuit diagram.

FIG. 2 illustrates a conventional drive circuit used with the FIG. 1 unit. In FIG. 2, reference numerals similar to those in FIG. 1 denotes the similar parts. In FIG. 2, an amplifying circuit 4 includes: an operational amplifier 41; an input resistor 40; a feed-back resistor 42; and a power amplifier 43. The amplifying circuit 4 is supplied with a servocontrol signal SV at one end of the input resistor 40 whose other end is connected to the negative input terminal of the operational amplifier 41. The positive input terminal of the operational amplifier 41 is grounded via a resistor 44. Thus the circuit 4 basically supplies drive current Iv which is proportional to the voltage of the signal SV. A control unit 6 generates an appropriate voltage for the SV signal in accordance with commands and servo-signals read from servo-tracks on the disks and supplied on line 6a.

The negative input terminal of operational amplifier 41 is also connected to a switch circuit 50 via another input resistor 51 for selectively applying a predetermined voltage Vee to the operational amplifier 41. The switch circuit 50 is closed in response to an adhesion release signal VC generated by the control circuit 6 upon starting of the unit. An analog switch IC, such as DG201 supplied by Siliconix Corp., can be used as the switch circuit 50. Numeral 7 identifies a motor for rotating the disk.

The adhesion releasing operation is explained as follows. When the unit is turned off, the head is moved to an inner guard area of disk 1 by means of a spring (not shown). As the rotation of the disk stops, the head contacts the disk surface and stays there. At this stage, the stopper 33b is close to and is almost touching the stop pin 35.

When the head is left at the same place on the disk surface, the lubricant gathers and fills all of the microscopic gaps between the head surface and the disk surface. As a result, the adhesion between the head surface and the disk becomes very tight.

When the unit is turned on, the disk drive motor 6 and the release signal VC are activated at the same time. The inertia of the disk is relatively large and thus the rotation begins with a bit delay. However, the torque of the voice coil motor 32 (which is large enough to provide quick access times) moves the head further toward the inner side of the disk before the disk begins to rotate. Since, as noted above, the stopper 33b is almost touching the pin 35 already, the head movement compresses the stopper 33b against the pin 35 due to the torque of the voice coil motor 32. This compression must last until the disk actually begins to rotate, because if the head returns to the initial position while the disk is still not roating, then the head will again adhere tightly to the disk because of the lubricant that has gathered at that position.

In this conventional system, the drive current Iv of the voice coil motor 32 is a simple square waveform with steep rise and fall characteristics. The inventor of the present invention has discovered that, at the rising edge of the drive current waveform, the stopper 33b is driven with great acceleration against the pin 35. This causes an undesirable impact to or vibration of the head 2 and gimbals 2a. Furthermore, at the falling edge of the drive current waveform, the sudden release of the voice coil motor 32 torque causes the compresses stopper 33b bounce back and the head to quickly move outwards towards the disk area where data is recorded. If, when the head reaches the disk data recording area, the gimbals 2a are vibrating or the disk rotation speed is not yet high enough to cause the head to float, the head might damage (e.g., scratch) the data recording area.

Figure 3:
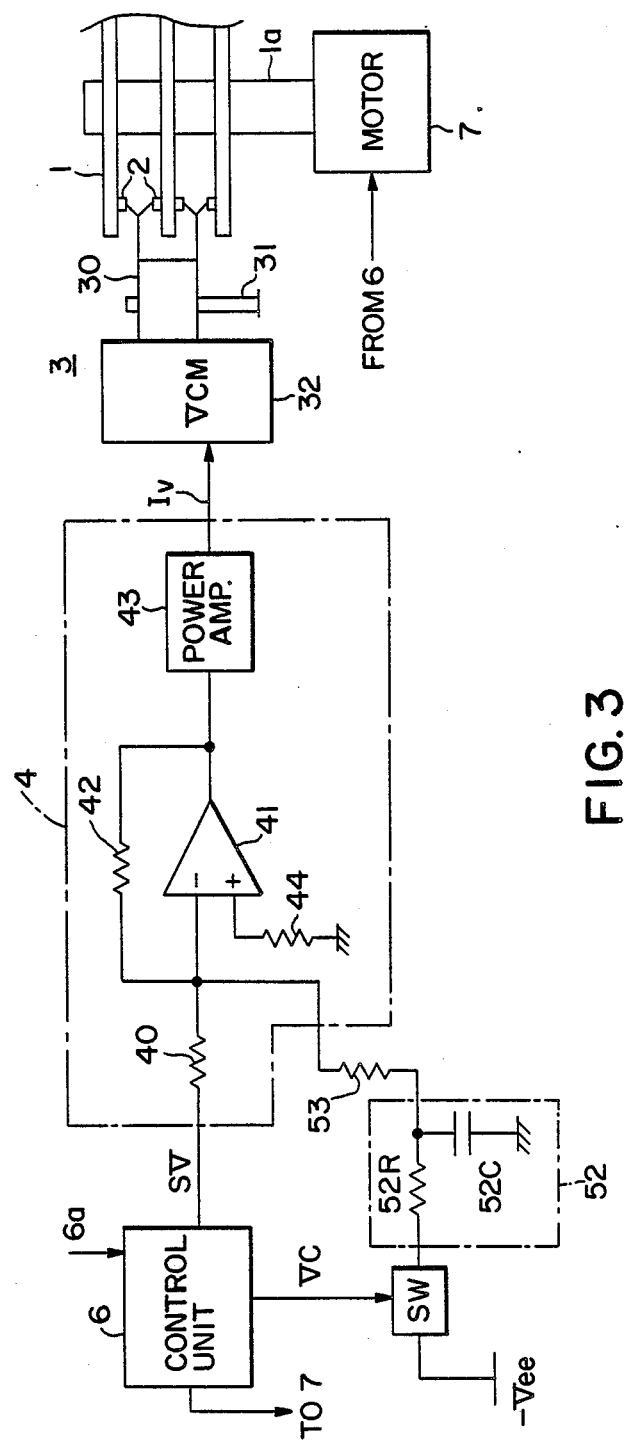
FIG. 3 illustrates an embodiment of the head actuator motor drive circuit diagram of this invention.

FIG. 3 illustrates an embodiment of the head actuator motor drive circuit of the present invention, wherein reference numerals that are the same as those in FIG. 2 denote the same or similar parts. FIG. 3 includes a time constant circuit 52 comprising a resistor 52R and a capacitor 52C. The time constant circuit 52 provides an improved drive current such as shown in FIG. 4 (c). FIG. 4 is a timing chart of various signals of the FIG. 3 circuit when the disk file unit is started, wherein (a) is a unit start signal, (b) is the adhesion release signal VC, (c) is the drive current for the voice coil motor 32, (d) is a drive current for the disk rotating motor 7 and (e) is an actual rotating speed of the disk. In FIG. 4(c), the dotted line represents the conventional waveform. The duration T of signal VC is slected to be longer than the time necessary for the disk to actually begin to rotate, for example, approximately 200 to 300 milliseconds. The time constant of the circuit 52 is empirially determined, an exemplary value is approximately 30 to 70 milliseconds. The total resistance of the resistors 52R and 53 corresponds to the resistance of the resistor 51 in FIG. 2.

As the drive current Iv gradually increases, the stopper 33b is pressed against the pin 35 with only a small acceleration. This avoids any damaging inpact or vibration. More importantly, as the drive current Iv gradually decreases, the stopper 33b does not bounce back, and therefore, damage to the data recording area of the disk surface is prevented.

The foregoing is considered illustrative of the principles of the present invention, and numerous modifications and changes are possible. For example, the time constant circuit 52 may be replaced by an integrated circuit utilizing an operational amplifier, or both the switch 50 and the circuit 52 may be replaced by a digital circuit which generates a pre-programed wave function. The swing-type actuator 3 also may be replaced by a linear voice coil motor. Many variations of the stopper means are also readily available. Therefore, it is not desired to limit the invention to the exact construction and operation of the embodiment of the present invention shown and described.

What is claimed is:

1. A method for releasing adhesion between a magnetic head and a magnetic disk having a data area, upon starting of a magnetic disk file unit, which unit comprising a first motor for rotating the disk, an actuator for actuating and supporting the head, a second motor for driving the actuator, stopper means with elastic material for restricting the movement of the actuator, the method comprising steps of:

(a) applying drive current to the first motor to rotate the disk;

(b) applying drive current to the second motor to move the head in a radial direction of the disk and to compress the elastic material of the stopper means;

(c) maintaining the drive current to the second motor at least until the disk begins to rotate; and (d) gradually reducing the drive current to the second motor so as to gradually release the elastic material of the stopper means.

2. A method claimed in claim 1, wherein in step (b), the drive current to the second motor is gradually increased.

3. A magnetic disk memory unit which comprising:
a magnetic disk;
first motor means, mechanically connected to the disk, for rotating the disk;
a magnetic head;
actuator means for supporting and actuating the head along substantially a radial direction of the disk;
second motor means, mechanically connected to the actuator means, for driving the actuator means;
stopper means, provided at a part of the actuator means with elastic material, for restricting a movement of the actuator means; and
drive circuit means, electrically connected to the second motor means, for supplying the second motor means, upon starting the first motor means, with a drive current which has a polarity to make the actuator means compress the elastic material and a waveform that gradually rises, is maintained until at least and disk actually begins to rotate and gradually falls.

4. A magnetic disk memory unit as claimed in claim 3, wherein the drive circuit means includes;
switch means, connected to a predetermined voltage source, for selectively supplying the predetermined voltage, in response to an adhesion release signal, for a predetermined period of time;
time constant means, connected to the switch means, for transforming the selectively supplied predetermined voltage into a gradually rising and gradually falling voltage waveform; and
amplifying circuit means, connected to the time constant means and to the second motor, for supplying the drive current, which is proportional to the voltage waveform, to the second motor.

5. A method for releasing, in a magnetic disk file unit, adhesion between a magnetic head and a magnetic disk having a data area and a guard area, upon starting rotation of the magnetic disk, comprising the steps of:
(a) initiating rotation of the magnetic disk;
(b) gradually moving the magnetic head radially with a small acceleration along the disk toward the guard area before the magnetic disk begins to rotate;
(c) holding the magnetic head in the guard area until the magnetic disk begins to rotate; and
(d) permitting the magnetic head to move toward the data area.

6. A method for releasing adhesion in a magnetic disk file unit according to claim 5, wherein the magnetic disk file unit includes an elastic stopper, step (b) includes moving the magnetic head so as to gradually compress the elastic stopper, and step (d) includes gradually releasing the magnetic head from the elastic stopper.

7. A method for releasing adhesion in a magnetic disk file unit according to claim 6, wherein the magnetic disk unit includes a drive motor for driving the magnetic head, and step (b) further includes:
applying a drive current to the drive motor, the drive current having a gradual rise characteristic.

8. A method for releasing adhesion in a magnetic disk file unit according to claim 7, wherein step (d) further includes removing the drive current such that it has a gradual fall characteristic.

9. A magnetic disk file unit having a magnetic head and a magnetic disk having a data area and a guard area, comprising:
means for initiating rotation of the magnetic disk upon starting the disk file unit;
means for gradually moving the magnetic head radially with a small acceleration along the disk towards the guard area before the magnetic disk begins to rotate;
means for holding the magnetic head in the guard area until the magnetic disk begins to rotate; and
means for permitting the magnetic head to move toward the data are after the magnetic disk begins to rotate.

10. A magnetic disk file unit according to claim 9, wherein said magnetic disk file unit further includes;
an elastic stopper means for restricting movement of the magnetic head in the radial direction such that said means for gradually moving the magnetic head radially gradually compresses said elastic stopper.

11. A magnetic disk file according to claim 10, wherein said magnetic disk unit further includes:
a drive motor operatively connected to the magnetic head; and
said means for gradually moving the magnetic head radially includes means for applying a drive current to the drive motor having a gradual rise characteristic.

12. A method for releasing adhesion according to claim 5, wherein step (d) includes the step of gradually permitting the magnetic head to move toward the data area.

13. A magnetic disk file unit according to claim 9, wherein said means for permitting the magnetic head to move includes means for gradually moving the magnetic head towards the data area.

* * * * *